United States Patent
Dintenfass et al.

(10) Patent No.: US 11,176,542 B2
(45) Date of Patent: Nov. 16, 2021

(54) DUAL PIN PAYMENT INSTRUMENT

(71) Applicant: Bank of America Corporation, Charlotte, NC (US)

(72) Inventors: Katherine Dintenfass, Lincoln, RI (US); Tamara S. Kingston, Peoria, AZ (US)

(73) Assignee: Bank of America Corporation, Charlotte, NC (US)

( * ) Notice: Subject to any disclaimer, the term of this patent is extended or adjusted under 35 U.S.C. 154(b) by 26 days.

(21) Appl. No.: 16/598,413

(22) Filed: Oct. 10, 2019

(65) Prior Publication Data
US 2021/0110380 A1    Apr. 15, 2021

(51) Int. Cl.
| | |
|---|---|
| *G06K 19/06* | (2006.01) |
| *G06Q 20/36* | (2012.01) |
| *G06Q 20/04* | (2012.01) |
| *G06Q 40/02* | (2012.01) |
| *G06Q 20/40* | (2012.01) |
| *G06Q 20/10* | (2012.01) |
| *G06Q 20/38* | (2012.01) |
| *G06Q 20/20* | (2012.01) |

(52) U.S. Cl.
CPC ............. *G06Q 20/36* (2013.01); *G06Q 20/04* (2013.01); *G06Q 20/102* (2013.01); *G06Q 20/20* (2013.01); *G06Q 20/3821* (2013.01); *G06Q 20/40* (2013.01); *G06Q 40/02* (2013.01)

(58) Field of Classification Search
CPC ........ G06Q 20/34; G06K 19/06; G06K 19/07; G06K 7/08; G06K 7/10
See application file for complete search history.

(56) References Cited

U.S. PATENT DOCUMENTS

| | | |
|---|---|---|
| 6,749,114 B2 | 6/2004 | Madani |
| 7,080,781 B1 | 7/2006 | Kolbeck |
| 7,083,089 B2 | 8/2006 | Hopkins |
| 7,278,581 B2 | 10/2007 | Ong |
| 7,617,390 B2 | 11/2009 | Sharma et al. |
| 7,720,755 B1 | 5/2010 | Coyle |
| 8,256,667 B2 | 9/2012 | Poznansky et al. |
| 8,332,935 B2 | 12/2012 | Brown et al. |

(Continued)

OTHER PUBLICATIONS

Bob Beale, "New Plastics Can Conduct Electricity," https://phys.org/news/2011-02-plastics-electricity.html, University of New South Wales, Feb. 22, 2011.

(Continued)

*Primary Examiner* — Olabode Akintola
*Assistant Examiner* — Suckhwan Chon
(74) *Attorney, Agent, or Firm* — Weiss & Arons LLP; Michael A. Springs, Esq.

(57) ABSTRACT

A dual-pin payment instrument is provided. The payment instrument may provide a user access to funds made donated to the user. The payment instrument may include a first set of credentials that provide access to funds/credit owned by the user. The payment instrument may include a second set of credentials that provide access to funds/credit donated to the user. To an onlooker, use of the payment instrument may not appear any different than typical payment instrument use. However an ability to access donated funds/credit may provide the user access to the donated funds/credit in a respectful manner.

18 Claims, 6 Drawing Sheets

(56) References Cited

U.S. PATENT DOCUMENTS

| | | | |
|---|---|---|---|
| 9,710,635 B2 | 7/2017 | Hoornaert et al. | |
| 10,832,022 B1* | 11/2020 | Yaqub | G06K 7/10366 |
| 2006/0175417 A1* | 8/2006 | Ho | G06K 19/07 |
| | | | 235/492 |
| 2015/0095239 A1 | 4/2015 | Specogna et al. | |
| 2016/0217455 A1* | 7/2016 | Hosny | G06K 19/06187 |

OTHER PUBLICATIONS

"A Guide to EMV Chip Technology Version 2.0," https://www.emvco.com/wp-content/uploads/2017/05/A_Guide_to_EMV_Chip_Technology_v2.0_20141120122132753.pdf, EMVCo, LLC, Nov. 2014.

"New Glass-Like Polymer Could Conduct Electricity for Transparent Electronics," https://www.purdue.edu/newsroom/releases/2018/Q1/new-glass-like-polymer-could-conduct-electricity-for-transparent-electronics.html, Purdue University, Mar. 27, 2018.

Yonghoo Joo et al., "A Nonconjugated Radical Polymer Glass with High Electrical Conductivity," https://science.sciencemag.org/content/359/6382/1391.full, American Association for the Advancement of Science, Mar. 23, 2018.

"EMV Card with Fingertips Biometrics—Introducing the Biometric Payment Card," https://www.gemalto.com/financial/cards/emv-biometric-card, Gemalto, Retrieved on Aug. 28, 2019.

"Chip-Based EMV Payment Cards: How EMV Enables Secure and Convenient Payments in the United States," https://www.gemalto.com/techno-site/downloads-site/Documents/emv-infographic.pdf, EMVCo, Retrieved on Aug. 28, 2019.

"Gemalto Launches the First Biometric EMV Card for Contactless Payments," https://www.gemalto.com/press/Pages/Gemalto-launches-the-first-biometric-EMV-card-for-contactless-payments.aspx, Gemalto, A Thales Company, Retrieved on Aug. 28, 2019.

"What is EMV," https://perfectplastic.com/emv/what-is-emv/, Perfect Plastic Printing, Retrieved on Aug. 28, 2019.

"Smart Card Basics—A Short Guide 2019," https://www.gemalto.com/companyinfo/smart-cards-basics, Gemalto, A Thales Company, Retrieved on Aug. 28, 2019.

* cited by examiner

DUAL PIN PAYMENT INSTRUMENT

FIELD OF TECHNOLOGY

Aspects of the disclosure relate to a payment instrument that provides enhanced security of credentials routed across a communication network.

BACKGROUND

Mobile devices, such as smartphones are now ubiquitous tools. Mobile devices are used for a variety of purposes, including social and work related tasks. For example, socially, mobile devices are used for communication among friends. Friends that live geographically apart and would otherwise not be able to regularly speak or see each other may, using their mobile devices, be in regular contact with each other.

For example, friends may form group chats or other virtual groups where they may communicate and update each other on life events. Using their mobile devices, friends can easily share career accomplishments, life challenges, or appeal to their close circle of acquaintances for advice or other assistance.

Because friends may now be in regular contact with each other, an appeal for help by one friend may be viewed with creditability by other members of a virtual group. In response to the appeal for help, members of the virtual group may take action to provide the requested assistance. For example, based on prior or ongoing communications, friends may be aware that a member of their virtual group is in need of financial assistance. A request for help may be supported by shared communications that reflect lifestyle changes or provide contextual clues. Exemplary lifestyle changes may include moving to reduce housing costs or looking for a new job. Contextual clues may include comments or posted pictures that indicate a change in spending habits or use of charitable services.

Friends may be more aware of each other's struggles and may be more motivated to lend assistance because a request for help with those struggles may be associated with observable communications and contextual clues. However, the friend in need may not feel comfortable asking or accepting help from people outside their circle of close friends. Mobile devices may also make it easier for friends to share information with people outside the close circle of friends. So although friends may wish to help a friend in need, the struggling friend may be reluctant to ask or accept help because of a possibility that their needs or situation may be publicized outside the trusted circle of friends.

Outside the context of electronica social networking, friends may become of aware that an acquaintance needs financial assistance by talking to the acquaintance or through other mutual friends. The friends may wish to help, efficiently and respectfully.

It would be desirable to provide a system and apparatus that allows friends to provide assistance to each other by enhancing functionality of payment instruments already in use by a friend-in-need (hereinafter, "donee"). It would be desirable to provide a system and apparatus that allows donors to provide assistance to a donee in a manner that maintains the dignity of the donee. Maintaining the dignity of a donee may include providing access to donated funds in manner that is indiscernible to an onlooker.

Accordingly, it would be desirable to provide a DUAL PIN PAYMENT INSTRUMENT.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Apparatus for a payment instrument is provided. Payment instruments may store data in a magnetic strip, a bar code, a silicon chip, non-volatile computer readable media or any other suitable data storage device or format. Illustrative payment instruments may include a credit card, debit card, a check, a device that includes a contactless chip (such as an ISO14443-compliant contactless chip), a smart phone, a tablet computer, a transponder or any other suitable electronic purchasing devices.

A payment instrument may be associated with a digital wallet. A digital wallet may be configured to communicate with a merchant point-of-sale ("POS") terminal. The digital wallet application may transfer a token or other information to the POS terminal. Based on the information received from the digital wallet, the POS terminal may attempt to process a purchase transaction. A payment instrument may include information stored by the digital wallet and provided to the POS terminal.

A customer (alternatively, "user" or "donee") may purchase goods or services ("the product") from a merchant by presenting a payment instrument at a POS terminal. The purchase may be conducted through any suitable channel of commerce. The payment instrument may allow the customer to draw on a line-of-credit or transfer funds to the merchant in exchange for the desired product. The payment instrument may provide the customer/merchant access to funds or credit controlled by an issuing bank (the "issuer") associated with the payment instrument.

For example, customer funds may be held in an account at the issuing bank. The account of the customer may be maintained by the issuer associated with a payment instrument. The payment instrument may allow the customer to trigger a request to debit of the account held at the issuing bank.

The merchant may present the request submitted by the customer using the payment instrument to an acquiring bank (the "acquirer"). The acquirer may request that the issuing bank provide an authorization decision (e.g., "granted" or "denied") for the request. The issuer may be provided an opportunity to provide an authorization decision for the purchase before extending credit on behalf of the customer or before acquiescing to the request to debit the customer account.

Typically, by granting authorization for the transaction, the issuer accepts responsibility for subsequent costs associated with the purchase. Subsequent costs may be associated with settling the transaction, providing funds to the merchant, responding to allegations of fraud, chargebacks, or other events that arise after an authorization decision granting the purchase has been provided. An issuer may decline to accept responsibility for a transaction by denying authorization for the purchase in response to an authorization decision request.

The acquirer may request an authorization decision from the issuer by submitting a transaction record to the issuer via a transaction processing network. The transaction record may include items being purchase, amount of the purchase, location of the purchase, identity of the merchant, customer information and payment instrument information. A transaction processing network may link acquirers, issuers and other transaction participants such as donors that are willing to provide assistance to the customer.

Donors may donate funds/credit to donee. One or more donors may create a special account to hold donated funds/credit for the benefit of a donee. Funds may be transferred to the special account. A line of credit may be associated with the special account. A donee may be provided access to the funds or line of credit. A donor may pay off the line of credit after it is used by a donee. In some embodiments, a donee may request funds/credit from donors. In some embodiments, a donor may initiate a donation on behalf a donee. A special account may be associated with a set of credentials for accessing the special account. The special account may be administered by a third-party such as a bank or other financial institution.

The transaction processing network may receive an authorization decision from the issuer and transmit the authorization decision to the acquirer. In response to receiving a granted authorization decision, the merchant may release the desired product to the customer. In response to receiving a denial authorization decision, the merchant may prompt the customer to provide an alternative payment method (e.g., cash).

When a "granted" authorization decision is provided by the issuer, the acquirer pays the merchant for (and thus "acquires") the purchase. The transaction processing network (in communication with the issuer and the acquirer) may settle transactions between the issuer and the acquirer. A transaction settlement process may include a transfer of funds between two or more transaction participants. The transfer may be a "book transfer," an inter-bank transfer or any suitable transfer between the transaction participants. A settlement network may transfer the funds between transaction participants. Illustrative settlement networks may include the Federal Reserve Wire Network ("Fedwire") and other suitable settlement networks that are well known to those of ordinary skill in the art. The settlement network may include any suitable network linking one or more accounts of transaction participants.

A payment instrument may be presented to a merchant by the customer to purchase a product. The merchant POS terminal may receive data from, provide data to, or exchange data with the presented payment instrument. The presented payment instrument may be a physical payment instrument or a virtual payment instrument associated with a mobile wallet application.

In some embodiments, a payment instrument may include a housing. The housing may be plastic, metal or any other suitable material. Illustrative dimensions of the housing may be 85.60 millimeters ("mm")×53.98 m×0.8 mm. The payment instrument may include a microchip. The microchip may include one or more integrated circuits. The microchip may include an integrated circuit that provides the functionality of a microprocessor. The microchip may store account information. The microchip may be embedded in the housing. For example, the microchip may have a thickness that is not greater than 0.25 mm.

In digital wallet embodiments, the microchip may be part of a mobile device running the digital wallet application.

The microchip may store an executable payment processing application. The microchip may execute the payment processing application. A POS terminal may access the payment processing application stored on the microchip. The POS terminal may execute the payment processing application using hardware of the POS terminal. A microchip may store two or more payment processing applications.

A payment processing application may provide rules that determine an outcome of a purchase or other transaction. Illustrative outcomes may include whether an issuer or other transaction participant will grant or deny the purchase. The payment processing application, when executed, may generate a unique code that is only valid for the instant purchase. The unique code may be transmitted to the issuer for consideration as part of an authorization decision.

The POS terminal may interact with the microchip via contact or contactless communication. When using contact communication, the microchip may physically touch a chip reader or other component of a POS terminal. When using contactless communication, a payment instrument may include a wireless communication circuit. The wireless communication circuit may transmit information stored on the microchip to the POS terminal and receive information from the POS terminal.

When a payment instrument is inserted into a POS terminal, the POS terminal may provide power and activate the microchip and/or a wireless communication circuit. The payment processing application stored on the microchip may be executed to verify an identity of the customer, an authenticity of microchip and/or account information stored on the microchip.

For example, to verify the customer's identity, the POS terminal may prompt the customer to enter a code at a POS terminal. The code may be a personal-identification-number ("PIN"). Entry of a first PIN may identify the customer and may trigger execution of a first payment processing application. The POS terminal may verify an entered PIN by comparing a PIN entered by the customer to a data element stored on the microchip. The PIN may be encrypted before comparing to the data element stored on the microchip. The POS terminal may verify a PIN by transmitting the PIN to a remote server for verification. The PIN may be encrypted before transmitting the PIN to the remote server.

The first payment processing application may be configured to generate a unique code based on a first set of credentials linked to the first payment processing application. A set of credentials may include information required to authenticate, authorize and process a purchase transaction. Such information may include a unique number assigned to the payment instrument, a name of a customer associated with the payment instrument, an expiration date of the payment instrument, an issuer associated with the payment instrument and any other suitable information.

The first set of credentials may include a first account associated with the purchasing instrument. The first account may be associated with personal funds/credit of the customer or donee.

The microchip may store a second payment processing application. The microchip may execute the second payment processing in response to entry of a second code at the POS terminal. The second code may be a second PIN. When the second PIN is entered, the second payment processing application may be configured to process the transaction using a second set of credentials. The second set of credentials may include a second account. The second account may hold funds/credit donated to the customer or donee. The second set of credentials may include the first set of credentials.

The second payment processing application may be configured may be activated based on an identity of a merchant operating a POS terminal. The second payment processing application may be configured to verify the identity of the POS terminal operator before processing the transaction using the second set of credentials. For example, donors may place restrictions on a type of products that may be purchased using donated funds or where donated funds may be spent. Illustrative restrictions may include limiting use of donated funds for purchases at a specific merchant.

A merchant may match donated funds or provide other incentives to add value to a donee making a purchase using donated funds. The merchant may be willing to match funds based on the fact that other donors have already contributed funds to the donee.

Illustrative restrictions may include limiting use of donated funds to purchase specific types of products such as groceries, baby care products or other basic household items. Illustrative restrictions may include limited use of donated funds to purchase items manufactured by specific companies or within a predetermined price range. The second payment processing application may be updated to include donor restrictions. The second payment processing application may be updated when a payment instrument is in communication with a POS terminal.

The second payment processing application may be configured to process a first amount of the purchase using the first set of credentials and a second amount of the purchase using the second set of credentials. The second payment processing application may include computer executable code for determining how to process a purchase using a combination of the first and second set of credentials.

For example, in response to entry of the second code, the second payment processing application may determine a first amount of funds to be debited from a personal account and a second amount to be debited from donated funds held in another account. The second payment processing application may determine the second amount (of donated funds) based on a subset of products included in the purchase transaction or compliance with any other donor restriction. The subset may correspond to products within a class of products that donors have specified are eligible to be purchased using donated funds. The first amount (of personal funds) may be determined based on a difference between the second amount and a total purchase amount.

A payment instrument may include a biometric reader. In some embodiments, the POS terminal may include a biometric reader. The microchip may store a biometric feature of the customer. A first payment processing application may be activated when the user of the payment instrument enters a first PIN. The first PIN may be captured by the POS terminal. The POS terminal may initiate execution of the first payment processing application in response to verifying the first PIN entered by the user.

A second payment processing application may be activated in response to validating a biometric feature captured by the biometric reader. The captured biometric feature may be verified by comparing the captured feature to the biometric data stored on the microchip. Verifying a biometric feature may confirm an identity of the individual in possession of the payment instrument before authorizing use of donated funds to pay for a purchase. Validating a captured biometric feature may confirm that the identity of the individual in possession of the payment instrument is an intended beneficiary of the donors.

Apparatus for a payment instrument is provided. The payment instrument may include a housing. The payment instrument may include a mobile device running a digital wallet application. The payment instrument may include a wireless circuit. The wireless circuit may be encapsulated within the housing. The wireless circuit may be protected by the housing.

The wireless circuit may be configured to implement protocols for wireless communication. For example, the communication circuit may provide Ethernet, Wi-Fi, near field communication ("NFC"), Bluetooth or any other suitable mode of communication. Illustrative protocols for NFC are provided by the NFC Forum at www.nfc-forum.org. Wi-Fi may include passive Wi-Fi with lower power consumption than typical Wi-Fi. The communication circuit may have a thickness that is not greater than 0.8 mm.

The payment instrument's power source may include high frequency signals. The payment instrument may be configured to utilize high frequency signals to receive information from a POS terminal and to power the microchip. High frequency signals may be signals that have a transmission range that is less than 50 centimeters ("cm").

The payment instrument may include a first microchip coupled to the wireless circuit. The first microchip may be a first microchip. The first microchip may be implement "EMV" compliant protocols. EMV is a technology that derives its name from the companies (Europay, MasterCard, and Visa) that developed the technology. The first microchip may be activated based on wireless communication with a POS terminal. The POS terminal may transmit high-frequency signals that activate the wireless circuit and first microchip. In some embodiments, in addition to wireless communication with the POS terminal, the first microchip may require entry of a valid first PIN at the POS terminal. The first microchip may be configured to be activated in response the wireless circuit receiving a wireless signal from a POS terminal.

The first microchip may be configured to execute a first payment processing application. When activated, the first payment processing application may be configured to process a purchase transaction using a first set of credentials. For example, the first payment processing application may process a purchase transaction using funds/credit associated with a first account linked to the payment instrument. The first account may be an account holding personal funds of a customer.

The payment instrument may include a second microchip. The second microchip may be configured to execute a second payment processing application. The second microchip may be a second EMV compliant chip. The second microchip may not be visible from an outside of the payment instrument. The second microchip may be configured to be activated in response to receiving a signal transmitted via direct contact with a POS terminal.

The second payment processing application may be configured to process the transaction using a second set of credentials. The second set of credentials may be activated in response to entry of a valid second PIN.

The second PIN may trigger execution of the second payment procession application. The second payment processing application may include credentials for processing a purchase transaction using funds/credit associated with a second account linked to the payment instrument. The second account may be an account holding donated funds.

In some embodiments, both the first and second payment processing applications may require entry of a valid PIN. The POS terminal may capture a PIN entered by the customer. The POS terminal may query the first and second microchips to determine whether the captured PIN is a valid PIN associated with the first payment processing application stored on the first microchip or the second payment processing application stored on the second microchip.

When the payment instrument receives a signal from the POS terminal using direct contact communication, the second microchip may be queried first to validate a captured PIN. When the payment instrument receives a wireless signal from the POS terminal, the first microchip may be queried first to validate a captured PIN.

When the first PIN is entered at the POS terminal, the issuer may provide an authorization decision based on a balance or line-of-credit associated with the first credentials (e.g., personal account of the donee). When the second PIN is entered at the POS terminal, the issuer may provide an authorization decision based on a balance or line-of-credit associated with the second credentials (e.g., donor account).

In some embodiments, the POS terminal may be configured to accept two or more PINs. For example, if first and second PINs are each four digits, the customer may enter eight digits at the POS terminal. When both PINs are entered, both the first and second microchips and first and second payment processing applications may be activated by the POS terminal. The issuer may provide an authorization decision based on a collective balance or line-of-credit associated with the donee's personal account and a donor account linked to the payment instrument.

In some embodiments, the second microchip may include electrical contacts configured to receive a signal when the electrical contacts touch a component of a POS terminal. In some embodiments, the second microprocessor may require direct contact with the POS terminal to activate the second payment processing application.

A microchip may store information needed to process a purchase transaction. For example, the microchip may store a series of randomly generated numbers (e.g., a "token") that correspond to a set of credentials. The token may be transmitted to a merchant POS terminal. The POS terminal may forward the token to an issuer associated with the payment instrument. The issuer may hold a key needed to decipher the token and correlate the token to specific credentials, such as a user bank account.

As part of an authorization process, the issuer may examine the specific user account and/or a historical transaction history associated with the specific user account. The issuer may provide the POS terminal with an authorization decision that either grants or denies the purchase transaction. The issuer may provide an updated token that is uploaded to the microchip by the POS terminal. A token may be dynamically changed with each transaction so that a token is only usable for a single transaction.

The second set of credentials may include the first set of credentials. Thus, payment for a purchase transaction processed using the second set of credentials may include a debit to a personal account of the donee and a debit to a donor account.

A POS terminal may be operated by a merchant. The merchant may be assigned a merchant category code ("MCC"). The MCC may be assigned based on products sold by the merchant. A MCC may classify a merchant based on a primary line of business conducted by the merchant.

For example, the merchant may be assigned a MCC based on whether the merchant provides predominately goods or provides predominately services. If a merchant provides both goods and services, the MCC assigned to the merchant may correspond to the greater portion of the merchant's business.

A MCC may be assigned by the acquirer. The acquirer may assign the MCC to the merchant at a time the merchant agrees to accept payment instruments as a form of payment. A merchant may be assigned multiple MCCs. For example, the merchant may provide pharmacy products and grocery products. The pharmacy products may be assigned a first MCC and the grocery products may be assigned a second MCC. The MCC may classify the merchant based on a market segment serviced by the merchant. Exemplary MCCs and associated market segments are shown below in Table 1.

TABLE 1

Illustrative MCCs and associated market segments.

| Illustrative Merchant Category Code ("MCC") | Illustrative Associated Market Segment |
|---|---|
| 0742 | Veterinary Services |
| 4214 | Motor Freight Carriers and Trucking - Local and Long Distance, Moving and Storage Companies, and Local Delivery Services |
| 4812 | Telecommunication Equipment and Telephone Sales |
| 5047 | Medical, Dental, Ophthalmic, and Hospital Equipment and Supplies |
| 5172 | Petroleum and Petroleum Products |
| 5718 | Fireplace, Fireplace Screens, and Accessories Stores |

The second payment processing application may be configured to determine an identity of a merchant operating a POS terminal. The identity may include a name and/or location of the merchant. The identity may include an MCC associated with the merchant. The second payment processing application may identify the POS terminal operator before processing a transaction using the second set of credentials.

The second payment processing application may implement a restriction associated with the donor account. For example, funds in the donor account may only be used for purchases at a POS terminal operated by a merchant associated with specific MCC. Restricting use of funds in the donor account to a specific MCC may ensure that donated funds are used for products that conform to the wishes of the donors. Restricting use of funds in the donor account to a specific MCC may ensure that donor funds are used for basic household products.

In some embodiments, the second payment processing application may be configured to process a first amount of a purchase transaction using the first set of credentials. The first set of credentials may be stored on a first microchip. The second payment processing application may be configured to process a second amount of the purchase transaction using the second set of credentials. The second set of credentials may be stored on a second microchip.

A transaction processed using a combination of the first and second credentials may be partially funded by funds in a personal account of the donee and partially funded by donor funds. A transaction processed using a combination of the first and second credentials may require activation of the first and second microchips. A transaction processed using a combination of the first and second credentials may require entry of first and second PINS to activate the first and second microchips.

The second amount, provided by donor funds, may be determined based on a subset of products included in the transaction. For example, a purchase transaction may include products that qualify for using donor funds and may include products that do not qualify for donor funds. The second payment processing application may be configured to identify products that do qualify for using donor funds.

The second payment processing application may be configured to use a set of credentials that provide access to donor funds to pay for the purchase of qualifying products. The second payment processing application may be configured to use personal funds of the donee to pay for non-qualifying products part of the same purchase.

In some embodiments, the second payment processing application may be configured to detect whether a purchase includes qualifying and non-qualifying products. When the purchase includes qualifying and non-qualifying products, the second payment processing application may be configured to activate a first payment processing application and access credentials for payment of the non-qualifying products. The first payment processing application may be stored on the same microchip as the second payment processing application. The first payment processing application may be stored on different (e.g., a second) microchip.

When the second payment processing application funds a purchase transaction using donor funds or a combination of donee and donor funds, a flag may be appended to the purchase transaction. The flag may be appended to the purchase transaction based on instructions included in the first or second payment processing instructions. The flag may be appended to the purchase by an issuer that receives a request to authorize the purchase transaction based on donor funds. Appending the flag may include setting a bit within the first or second microchip.

The flag may immunize the purchase transaction from adverse consequences associated with insufficient resources to fund the purchase. The flag may immunize the purchase transaction from adverse consequences associated with insufficient resources to fund the purchase of non-qualifying products. Such immunization may be due to availability of donors funds linked to the payment instrument. The availability of donor funds may provide verification that the donee is in need of financial assistance.

In payment instrument embodiments that include a first microchip and a second microchip, the first and second microchips may be electronically isolated from each other. Each microchip may be configured to independently process a purchase transaction without communicating with the other microchip. Each microchip may store encrypted account details. For example, the first microchip may store a first token that includes encrypted details corresponding to a donee's personal account. The second microchip may store a second token that includes encrypted details corresponding to a donor account. The donee or owner of the payment instrument may not otherwise have access to the donor account details.

In some embodiments, only one, and not both, of the first or second microchips may be configured to process a purchase transaction. In such embodiments, a purchase transaction may be wholly funded by donee funds or donor funds, but not a combination of donee and donor funds. In such embodiments, if a purchase includes qualifying and non-qualifying products, donor funds may not be used for the purchase.

Methods for using a single payment instrument to process a transaction using donee credentials and donor credentials are provided. Methods may include providing a payment instrument that includes a first microchip and a second microchip. The first microchip may be a first EMV chip. The second microchip may be a second EMV chip.

Methods may include detecting when the payment instrument is inserted into a card reader such that the first microchip is positioned to be read by the card reader. In response to detecting that the first microchip is positioned to be read by the card reader, methods may include processing a purchase transaction using a donee credentials. The donee credentials may be stored on the first microchip.

Methods may include detecting when the payment instrument is inserted into a card reader such that the second microchip is positioned to be read by the card reader. In response to detecting that the second microchip is positioned to be read by the card reader, methods may include processing a purchase transaction using donor credentials. The donor credentials may be stored on the second microchip.

In response to detecting that the second microchip is positioned to be read by the card reader, methods may include processing the purchase transaction using the donor credentials and the donee credentials. In response to detecting that the first microchip is positioned to be read by the card reader, methods may include prompting for a first code for unlocking the donee credentials.

In response to prompting for a first code, methods may include receiving the first code and a second code. The first code may be a first PIN. The second code may be a second PIN. Methods may include using the first code to unlock the donee credentials stored on the first microchip. In response to the receiving the first and second codes, methods may include activating the second microchip. Methods may include using the second code to unlock the donor credentials stored on the second microchip. Methods may include processing the purchase transaction using the donor credentials and the donee credentials.

Methods may include inserting the payment instrument into the card reader in a first orientation to position the first microchip to be read by the card reader. Methods may include inserting the payment instrument into the card reader in a second orientation to position the second microchip to be read by the card reader. Inserting the payment instrument in the first orientation may include inserting a first edge of the payment instrument into the card reader. Inserting the payment instrument in the second orientation may include inserting a second edge, spaced apart from the first edge by a length of the payment instrument, into the card reader.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

Figure 1:
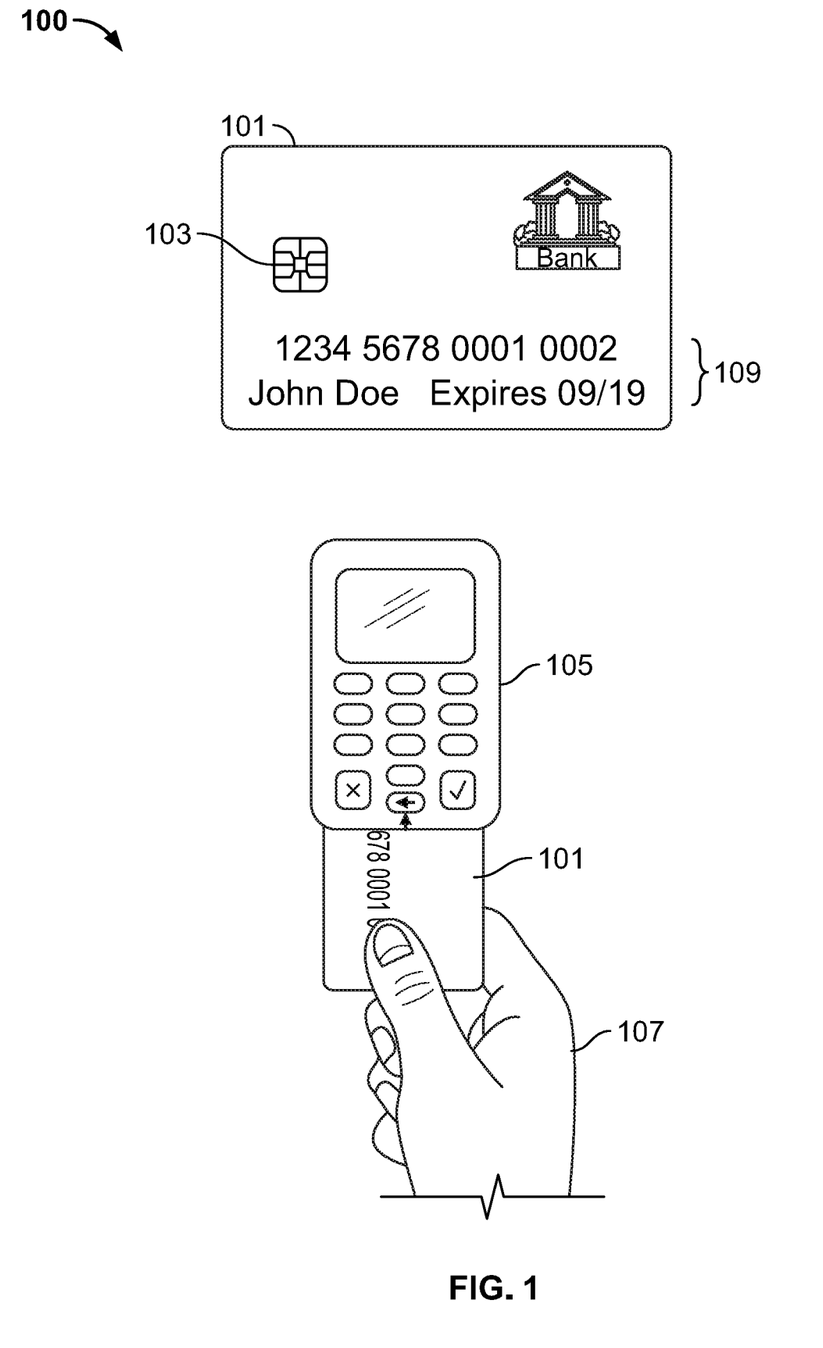
FIG. 1 shows illustrative apparatus in accordance with principles of the disclosure.

FIG. 1 shows illustrative apparatus 100. Apparatus 100 includes payment instrument 101. Payment instrument 101 includes microchip 103. Microchip 103 may be an EMV chip. When user 107 inserts payment instrument 101 and its associated microchip 103 into card reader 105, the reader may power and activate microchip 103. Microchip 103 may be configured to execute a payment processing application that provides access to a token stored on microchip 103. The payment processing application may generate a new token each time payment instrument 101 is used for a purchase transaction. Thus, simply capturing sensitive data 109 printed on the face of payment instrument 101 or encoded on a magnetic stripe may be insufficient to initiate an unauthorized transaction.

Figure 2:
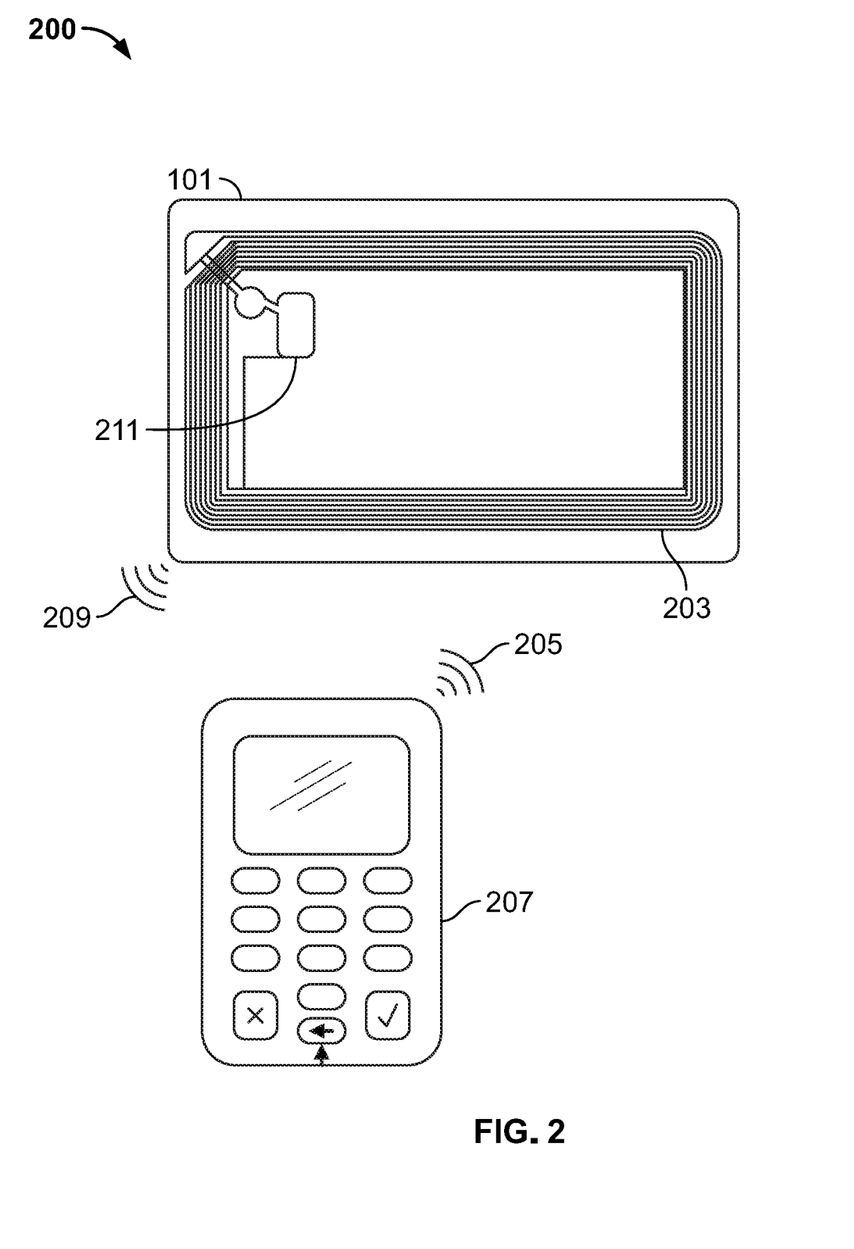
FIG. 2 shows illustrative apparatus in accordance with principles of the disclosure.

FIG. 2 shows that in addition to microchip 103, payment instrument 101 includes wireless circuit 203. Wireless circuit 203 may provide Wi-Fi, near-field communication ("NFC"), Bluetooth, satellite, cellular or any other suitable mode of wireless communication. Wi-Fi may include passive Wi-Fi with lower power consumption than typical Wi-Fi. The communication circuit may have a thickness that is not greater than 0.8 mm.

The payment instrument 101 includes processor circuit 211. Processor circuit 211 may alternatively be referred to herein as a software chip. Processor circuit 211 may have a thickness that is not greater than 0.25 mm. Processor circuit 211 may include a microprocessor for controlling operation of payment instrument 101 and its associated components. Processor circuit 211 may control operation of microchip 103. In some embodiments, microchip 103 may include processor circuit 211.

Processor circuit 211 may include RAM, ROM, an input/output ("I/O") module and a non-transitory or non-volatile memory. The I/O module may include a microphone, button and/or touch screen which may accept user provided input. The I/O module may include one or more of a speaker for providing audio output and a video display for providing textual, audiovisual and/or graphical output. The video display may include one or more OLEDs.

Software may be stored within the non-transitory memory and/or other storage medium. The software may provide instructions to processor circuit 211 for enabling payment instrument 101 to perform various functions. For example, the non-transitory memory may store software used by payment instrument 101 such as an operating system, application programs, and an associated database.

Application programs, which may be used by payment instrument 101, may include computer executable instructions for invoking user functionality related to communication, such as email, short message service ("SMS"), and voice input and speech recognition applications. Application programs may utilize one or more algorithms that control prompts presented at a merchant POS terminal, process received executable instructions, perform power management routines or other suitable tasks.

Processor circuit 211 may store information needed to process a purchase transaction. Processor circuit 211 may include a payment processing application. Processor circuit 211 may include a payment processor application that is different from a payment processing application stored on microchip 103.

Processor circuit 211 may store series of randomly generated numbers (e.g., a "token") that correspond to a set of credentials. The token may be transmitted from payment instrument 101 to a merchant POS terminal. The POS terminal may forward the token to an issuer associated with payment instrument 101. The issuer may hold a key needed to decipher the token and correlate the token to a specific account. The issuer may provide the POS terminal with an authorization decision that approves or denies the purchase transaction. The token may be dynamically changed with each transaction so that a token is only usable for a single transaction.

Processor circuit 211 may control communications 205 and 209 between wireless circuit 203 and POS terminal 207. When payment instrument 101 is within a communication range of POS terminal 207, processor circuit 211 may receive power from POS terminal 207. POS terminal 207 may emit high frequency signals that provide power to microchip 103 and/or processor circuit 211.

Processor circuit 211 may issue commands to POS terminal 207. The commands may configure POS terminal 207 to present at least two options for authorizing a purchase transaction. The first option may include requesting that customer 107 provide authentication for processing the purchase transaction based on a first set of credentials. Providing authentication may include entering a PIN or submitting a biometric feature for validation. The PIN may be a unique PIN tied to the first set of credentials.

The first set of credentials may include a first account. The first account may be associated with funds or credit. The first account may be a personal account of customer 107. The first set of credentials may be securely stored at location remote from payment instrument 101. For example, the first set of credentials may be maintained by an issuer bank associated with payment instrument 101.

When customer 107 successfully provides authentication for processing the purchase transaction based on the first credentials, POS terminal 207 may submit an authorization request to an issuer associated with the first credentials. As part of an authorization decision process, the issuer may evaluate whether to approve a purchase transaction based on the first set of credentials.

The second option may include requesting that customer 107 provide authentication for processing the purchase transaction based on a second set of credentials. Providing authentication may include entering a PIN or submitting a biometric feature for validation. The PIN may be a unique PIN tied to the first set of credentials.

The second set of credentials may be associated with microchip 103. If customer 107 wishes to utilize the second set of credentials, processor circuit 211 may be configured to extract the first set of credentials stored on microchip 103. In some embodiments, if customer 107 wishes to utilize the second set of credentials, processor circuit 211 may issue instructions to POS terminal instructing customer 107 to insert payment instrument 101 into a card reader. POS terminal 207 may include card reader 105.

The second set of credentials may include a second account. The second account may be associated with funds or credit donated to customer 107. Funds/credit associated with second account may be earmarked for specific products or for user at a specific merchant.

In some embodiments, processor circuit 211 may store a first token corresponding to the first set of credentials. Microchip 103 may store a second token corresponding to a second set of credentials. When payment instrument 101 communicates with POS terminal 207 using wireless circuit 203, processor circuit 211 may be configured to process a purchase transaction based the first token and the associated first set of credentials.

When customer 107 inserts payment instrument 101 into a card reader (e.g., card reader 105), processor circuit 211 may be configured to process a purchase transaction based on the second token stored on microchip 103. The second set of credentials may be linked to the token stored on microchip 103.

In some embodiments, customer 107 may insert payment instrument 101 into card reader 105 (shown in FIG. 1) and opt to process a purchase transaction using a first set of credentials associated with processor circuit 211. By inserting payment instrument 101 into card reader 105, customer 107 may convey to an onlooker that a typical microchip 103 transaction is being conducted. However, processor circuit 211 may be configured to allow customer 107 to provide authentication that processes a purchase transaction based on a second set of credentials.

The second set of credentials or a token associated with the second set of credentials may be communicated from processor circuit 211 to a POS terminal (e.g., 207) via wireless circuit 203. The second set of credentials or a token associated with the second set of credentials may be communicated from processor 211 to a POS terminal (e.g., 207) via wireless circuit 203 even when payment instrument is inserted into a card reader, such as card reader 105.

In some embodiments, reading information (e.g., a token) stored on microchip 103 may serve as a second factor authentication when processing a purchase transaction based on a token stored in processor circuit 211. In some embodiments, reading information (e.g., a token) stored on processor circuit 211 may serve as a second factor authentication such as when processing a purchase transaction based on a token stored in microchip 103.

Figure 3:
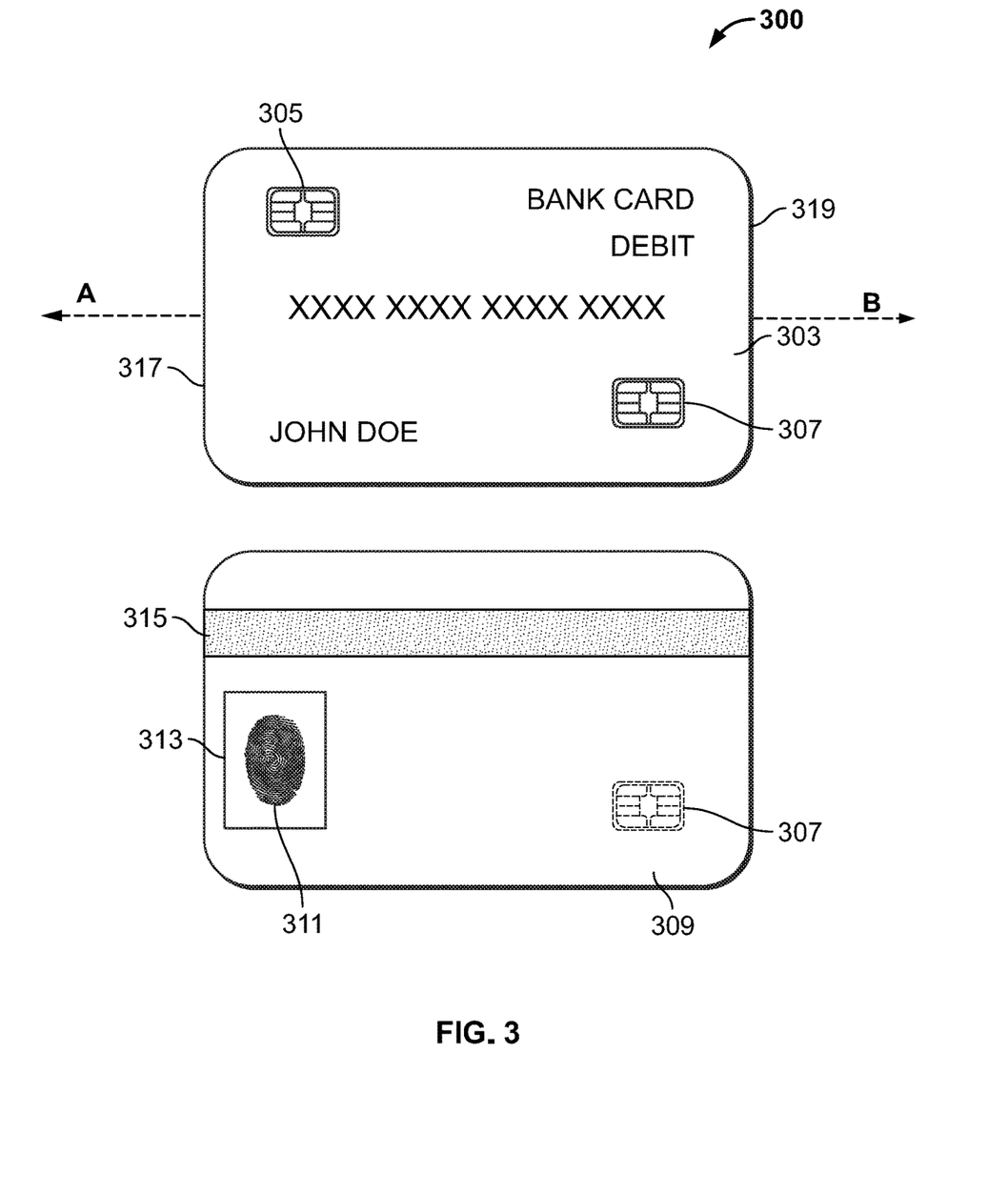
FIG. 3 shows illustrative apparatus in accordance with principles of the disclosure.

FIG. 3 shows illustrative payment instrument 300. Payment instrument 300 may include one or more features of payment instrument 101 (shown in FIGS. 1 and 2), including wireless circuit 203 (shown in FIG. 2). Payment instrument 300 includes front face 303. Microchip 305 is visible on front face 303. Microchip 305 may be an EMV chip.

Payment instrument 300 also includes microchip 307. Microchip 307 may be an EMV chip. In some embodiments, microchip 307 may be visible on front face 303. In some embodiments, microchip 307 may not be visible on front face 303.

Microchips 305 and 307 may be electronically isolated from each other. Payment instrument 300 may not include any circuitry that allows microchips 305 and 307 to communicate with each other.

Microchip 305 may store a first payment processing application for processing a purchase transaction using a first set of credentials. Microchip 305 may store a first token for processing a purchase transaction using the first set of credentials. Access to the first token may be controlled by a first PIN or a first biometric feature. An exemplary first biometric feature may include a right-hand index fingerprint.

Microchip 307 may store a second payment processing application for processing a purchase transaction using a second set of credentials. Microchip 307 may store a second token for processing a purchase transaction using the second set of credentials. The second token may be associated with a second PIN or a second biometric feature. An exemplary second biometric feature may include a left-hand index fingerprint.

A customer may insert leading edge 317 of payment instrument 300 into a card reader (e.g., card reader 105) along direction A. Inserting leading edge 317 of payment instrument 300 into the card reader along direction A may position microchip 305 to be read by the card reader. The location of microchip 305 may be an industry-standard location defined by the International Organization for Standardization ("ISO") and the International Electrotechnical Commission ("IEC"). Exemplary standards for the location of microchip 305 include ISO/IEC 7816 and/or ISO/IEC 14443, both of which are hereby incorporated by reference herein in their entirety.

In response to reading information stored on microchip 305, the card reader may prompt the customer to enter the first PIN or first biometric feature as authentication. In response to validating the presented authentication information, a first token stored on microchip 305 may be communicated to an issuer to authorize the purchase transaction.

A user may insert leading edge 319 of payment instrument 300 into a card reader along direction B. Inserting leading edge 319 of payment instrument 300 into the card reader along direction B may position microchip 307 to be read by the card reader. The location of microchip 307 may be an industry-standard location. In response to reading information stored on microchip 307, the card reader may prompt the user to enter the second PIN or second biometric feature as authentication. In response to validating the presented authentication information, the second token stored on microchip 307 may be communicated to an issuer to authorize the purchase transaction.

The first token associated with microchip 305 and the second token associated with microchip 307 may each be associated with different accounts and/or credentials.

Payment instrument 300 includes back face 309. Microchip 307 is shown in broken-line on back face 309. In some embodiments, microchip 307 may only be visible on back face 309 and not on front face 303. In such embodiments, a user may insert leading edge 319 of payment instrument 300 into a card reader along direction B such that microchip 307 is positioned to be read by the card reader (e.g., with back face 309 up). The location of microchip 307 on back face 309 may be an industry-standard location.

Back face 309 includes magnetic stripe 315. In some embodiments, donor funds/credit may be issued to a customer under a government administered social services program. Information for accessing the donor funds/credit may be encoded on the magnetic stripe, microchip 305 or microchip 307. In some embodiments, the magnetic stripe may include information corresponding to information stored on microchip 305 or microchip 307. Magnetic stripe 315 may provide backwards compatibility for card readers that do not include hardware for wireless communication or hardware for reading microchips.

Back face 309 also includes biometric reader 313. Biometric reader 313 is shown capturing fingerprint 311. However, biometric reader 313 may be a reader configured to capture any suitable biometric feature such as an iris, retina, or facial scan. Biometric reader may be controlled by a microprocessor, such as processor circuit 211 (shown in FIG. 2).

A biometric feature captured by biometric reader 313 may be used to authenticate a user before submitting a token stored on microchip 305 or microchip 307 to an issuer for authorization. In some embodiments, a first payment processing application stored on microchip 305 may not require biometric authentication before submitting the first token to an issuer for authorization. A second payment processing application stored on microchip 307 may require biometric authentication before submitting the first token to an issuer for authorization.

Figure 4:
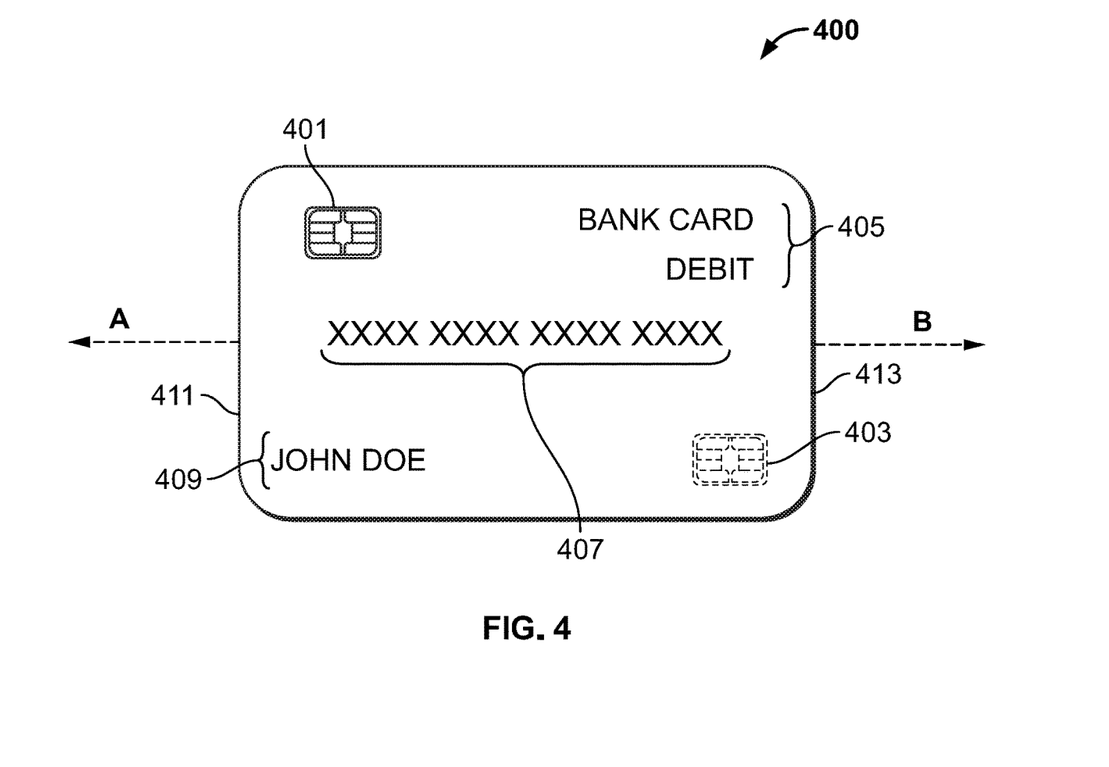
FIG. 4 shows illustrative apparatus in accordance with principles of the disclosure.

FIG. 4 shows illustrative payment instrument 400. Payment instrument 400 may include one or more features of payment instrument 101 (shown in FIGS. 1 and 2) and/or payment instrument 300 (shown in FIG. 3).

Payment instrument 400 includes microchip 401. Payment instrument 400 includes informational items 405 (issuer), 407 (card number) and 409 (user name). Microchip 401 is positioned relative to informational items 405, 407 and 409. The location of microchip 401 may be an industry-standard location defined by the International Organization for Standardization ("ISO") and the International Electrotechnical Commission ("IEC"). Exemplary standards for the location of microchip 401 include ISO/IEC 7816 and/or ISO/IEC 14443.

Microchip 401 may be positioned such that when leading edge 411 of payment instrument 400 is inserted into a card reader along direction A, microchip 401 will be positioned to be readable by the card reader. When leading edge 411 of payment instrument 400 is inserted into a card reader along direction A, microchip 401 may be positioned, inside a card reader, in an industry-standard location.

Payment instrument 400 also includes microchip 403. Microchip 403 may positioned such that when leading edge 413 of payment instrument 400 is inserted into a card reader along direction B, microchip 403 will be readable by the card reader. When leading edge 413 of payment instrument 400 is inserted into a card reader along direction B, microchip 403 may be positioned, inside a card reader, in an industry-standard location.

Microchip 403 is shown in broken-line. In some embodiments, microchip 403 may be embedded within a thickness of payment instrument 400 and may not be visible from an outside of payment instrument 400. Embedding microchip 403 within the thickness of payment instrument 400 may hide an existence of microchip 403 from others besides a donee or user of payment instrument 400. In such embodiments, microchip 403 may include a wireless circuit for communicating with a POS terminal.

In some embodiments, microchip 403 may be covered by a housing of payment instrument 400 such that microchip 403 is not visible from an outside of payment instrument 400. For example, a technique for producing conductive polymer material is now available. Such techniques are described an article entitled "A nonconjugated radical polymer glass with high electrical conductivity" and available at http://science.sciencemag.org/content/359/6382/1391?utm campaign=toc sci-mag 2018-03-22&et rid=40174079&et cid=1923453, and is hereby incorporated by reference herein in its entirety.

Microchip 403 may be covered with a conducting polymer film. The conducting polymer film may hide a presence of microchip 403 when viewing an outside of payment instrument 400. However, when payment instrument 400 is inserted into a card reader along direction B, microchip 403 may be read by contact-based communication through the conducting polymer film.

Covering microchip 403 with an opaque film may secure a token stored on microchip 403. Even if payment instrument 400 were to fall into the hands of an unauthorized user, the unauthorized user would not be aware of the presence of microchip 403, and would not insert leading edge 413 into a card reader along direction B.

Figure 5:
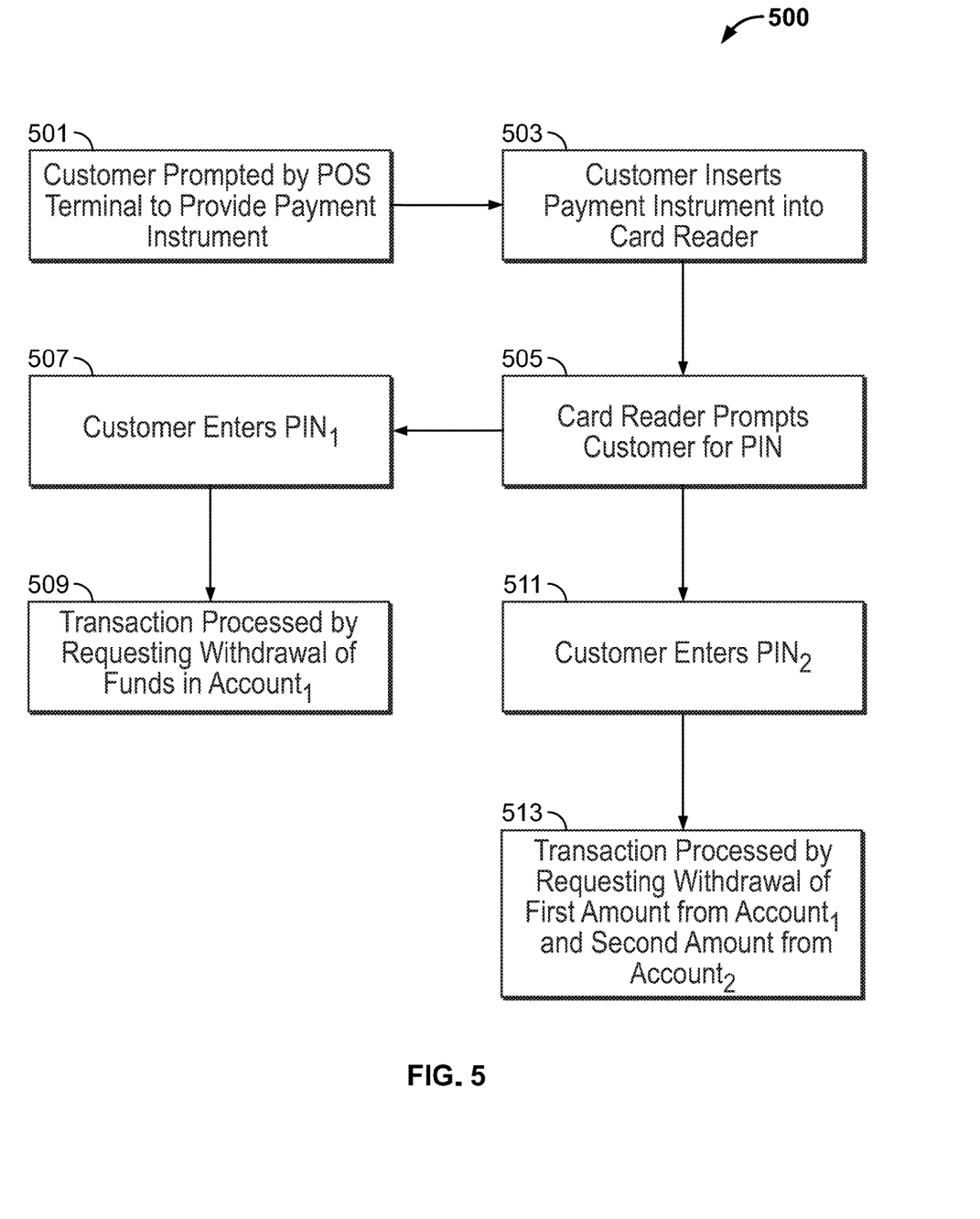
FIG. 5 shows an illustrative process in accordance with principles of the disclosure.

FIG. 5 shows illustrative process 500. One or more of the steps of the process illustrated in FIG. 5 may be performed by a "system." The "system" may include one or more of the features of the apparatus shown in FIGS. 1-4 and/or any other suitable device or approach. The "system" may be provided by an entity. The entity may be an individual, an organization or any other suitable entity.

Process 500 begins at step 501. At step 501, a customer is prompted by a POS terminal to provide a payment instrument. The POS terminal may prompt for the payment instrument as payment for a purchase. At step 503, the customer inserts a payment instrument into a card reader. At step 505, based on reading information stored on a microchip on the payment instrument, the card reader prompts the customer to enter a PIN.

At step 507, the customer enters $PIN_1$. $PIN_1$ may be associated with a first set of credentials linked to $Account_2$. At step 509, the purchase transaction is processed by requesting withdrawal of funds in $Account_2$.

Alternatively, in response to the request for PIN at step 505, at step 511, the customer may enter $PIN_2$. $PIN_2$ may be associated with a second set of credentials linked to $Account_2$. At step 513, the purchase transaction is processed by requesting withdrawal of funds in $Account_2$.

Process 500 shows that a payment instrument may be associated with two PINs (e.g., a dual-pin payment instrument). Entry of a first PIN (e.g., $PIN_1$) may cause a purchase transaction to be processed based on different set of credentials than if a second PIN (e.g., $PIN_2$) was entered. Entry of the second PIN may cause a purchase transaction to be processed based on different set of credentials than if the first PIN was entered. A payment instrument may include two sets of credentials stored on one microchip.

Figure 6:
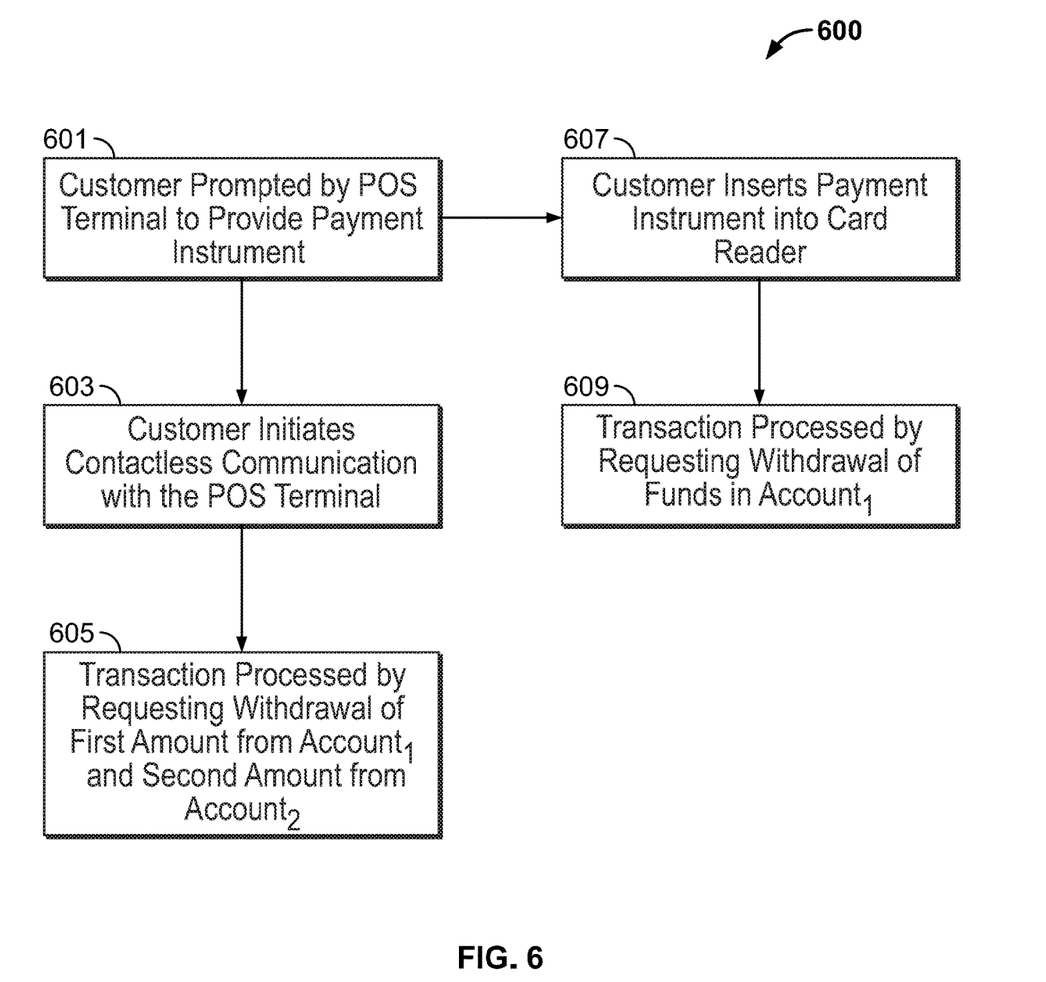
FIG. 6 shows an illustrative process in accordance with principles of the disclosure.

FIG. 6 shows illustrative process 600. One or more of the steps of the process illustrated in FIG. 6 may be performed by a "system." The "system" may include one or more of the features of the apparatus shown in FIGS. 1-4 and/or any other suitable device or approach. The "system" may be provided by an entity. The entity may be an individual, an organization or any other suitable entity.

Process 600 begins at step 601. At step 601, a customer is prompted by a POS terminal to provide a payment instrument as payment for a purchase transaction. At step 603, the customer initiates contactless communication with the POS terminal. The payment instrument may include a wireless circuit, such as wireless circuit 203 shown in FIG. 2, for wirelessly communicating with a POS terminal.

At step 605, based on the wirelessly provided information, the purchase transaction is processed by requesting withdrawal of a first amount from $Account_2$ and a second amount from $Account_2$. The payment instrument may include a processor circuit that is programmed to provide information for authenticating access to $Account_2$ and $Account_2$. The processor circuit may be configured to authenticate access to $Account_2$ and $Account_2$ when the payment instrument communicates wirelessly with the POS terminal. Account$_2$ may be a personal account of the card user. Account$_2$ may be an account holding donated funds for use by the card user.

Access to Account$_2$ may provide financial assistance to the card holder. Access to Account$_2$ may be provided to the card holder based on initiating the purchase transaction using the wireless communication capability of the payment instrument. Such seamless application of donated funds may preserve the dignity of the donee card holder.

Alternatively, in response to the prompts at step 601, at step 607, card holder may insert the payment instrument into a card reader. The card reader may be configured to read a microchip, such as an EMV chip, on the payment instrument. The microchip may provide information needed to authenticate access to Account$_1$. At step 609, the purchase transaction is processed by requesting withdrawal of funds in Account$_1$. When the payment instrument is inserted into a card reader, the purchase transaction may be processed only based on funds in Account$_1$. Account$_1$ may be associated with personal funds of a donee.

Thus, apparatus and methods for a DUAL PIN PAYMENT INSTRUMENT are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A payment instrument comprising:
  a housing;
  a wireless circuit encapsulated within the housing;
  a first EMV microchip:
    positioned on a front face of the payment instrument such that when a first edge of the payment instrument is inserted into a card reader, the first EMV microchip is positioned to read by the card reader; and
    coupled to the wireless circuit and configured to execute a first payment processing application; and
  a second EMV microchip:
    embedded within a thickness of the payment instrument such that the second EMV microchip is not visible from an outside of the payment instrument and when a second edge of the payment instrument is inserted into the card reader, the second EMV microchip is positioned to read by the card reader;
    covered with a conducting polymer film;
    readable by contact-based communication through the conducting polymer film; and
    configured to execute a second payment processing application; wherein:
  both the first EMV microchip and the second EMV microchip are configured to be read by the card reader;
  the first payment processing application is configured to process a purchase transaction using a first set of credentials that trigger debiting of a first account; and
  the second payment processing application is configured to process:
    a first amount of the purchase transaction using the first set of credentials; and
    a second amount of the purchase transaction using a second set of credentials that trigger debiting of a second account.

2. The payment instrument of claim 1 wherein:
  the first microchip is configured to be activated in response the wireless circuit receiving a wireless signal from a point-of-sale ("POS") terminal; and
  the second microchip is configured to be activated in response to receiving a signal transmitted via direct contact with the POS terminal.

3. The payment instrument of claim 1, wherein the second payment processing application is configured to:
  determine a Merchant Category Code ("MCC") associated with the purchase transaction before processing the purchase transaction using the second set of credentials; and
  process the purchase transaction using the second credentials only if the second account is authorized in connection with the MCC.

4. The payment instrument of claim 1 wherein the second amount is determined based on a subset of products included in the purchase transaction.

5. The payment instrument of claim 1 wherein the first and second microchips are electronically isolated from each other.

6. The payment instrument of claim 1, wherein only one of the first or second microchips can process the transaction.

7. The payment instrument of claim 1, wherein the wireless circuit comprises a near-field communication circuit.

8. The payment instrument of claim 2, wherein the second microchip comprises electrical contacts configured to receive the signal directly from the POS terminal.

9. A payment instrument comprising:
  a housing; and
  a microchip:
    embedded in the housing;
    covered by a conducting polymer film that hides a presence of the microchip when viewing an outside of the payment instrument;
    readable by contact-based communication through the conducting polymer film; and
    configured to execute:
      a first payment processing application triggered by entry of a first code at a point-of-sale ("POS") terminal in response to a prompt from the POS terminal;
      a second payment processing application triggered by entry of a second code at the POS terminal in response to the prompt from the POS terminal; and
      the first payment processing application and the second payment processing application triggered by entry of both the first code and the second code at the POS terminal in response to the prompt from the POS terminal;
  wherein, the first payment processing application is configured to process a purchase transaction using a first set of credentials and the second payment processing application is configured to process the purchase transaction using a second set of credentials.

10. The payment instrument of claim 9, wherein the second set of credentials includes the first set of credentials.

11. The payment instrument of claim 9, wherein the second payment processing application is configured to determine an identity of an operator of the POS terminal before processing the purchase transaction using the second set of credentials.

12. The payment instrument of claim 9, wherein the second payment processing application is configured to process a first amount of the purchase transaction using the first set of credentials and a second amount of the purchase transaction using the second set of credentials.

13. The payment instrument of claim 12 wherein the second amount is determined based on a subset of products included in the purchase transaction.

14. The payment instrument of claim 9 further comprising a biometric reader wherein, the second payment processing application is activated in response to validating biometric credentials captured by the biometric reader.

15. A method for using a single payment instrument to process a transaction using donee credentials and donor credentials, the method comprising:

provided a payment instrument comprising a first microchip and a second microchip;

detecting when a first edge of the payment instrument is inserted into a card reader such that the first microchip is positioned to be read by the card reader;

in response to detecting that the first microchip is positioned to be read by the card reader, processing a purchase transaction using the donee credentials, the donee credentials including first account information associated with the donee;

detecting when a second edge of the payment instrument is inserted into a card reader such that the second microchip is positioned to be read by the card reader; and in response to detecting that the second microchip is positioned to be read by the card reader:

conducting contact-based communication through a polymer film covering the second microchip; and processing a purchase transaction using the donor credentials, the donor credentials including second account information associated with the donor.

16. The method of claim 15 further comprising in response to detecting that the second microchip is positioned to be read by the card reader, processing the purchase transaction using the donor credentials and the donee credentials.

17. The method of claim 15 further comprising in response to detecting that the first microchip is positioned to be read by the card reader:

prompting for a first code for unlocking the donee credentials;

in response to prompting for a first code, receiving the first code and a second code for unlocking the donor credentials;

in response to the receiving the first and second codes, activating the second microchip and unlocking the donor credentials; and processing the purchase transaction using the donor credentials and the donee credentials.

18. The method of claim 15 further comprising:

inserting the payment instrument into the card reader in a first orientation to position the first microchip to be read by the card reader; and inserting the payment instrument into the card reader in a second orientation to position the second microchip to be read by the card reader;

wherein the first orientation comprises inserting the first edge of the payment instrument into the card reader and the second orientation comprises inserting the second edge, spaced apart from the first edge by a length of the payment instrument, into the card reader.

* * * * *